United States Patent
Beall et al.

(10) Patent No.: US 11,365,148 B2
(45) Date of Patent: Jun. 21, 2022

(54) TRANSPARENT HEXAGONAL STUFFED β-QUARTZ GLASS-CERAMIC ARTICLES HAVING LARGE GRAIN SIZE

(71) Applicant: CORNING INCORPORATED, Corning, NY (US)

(72) Inventors: George Halsey Beall, Big Flats, NY (US); John Philip Finkeldey, Elkland, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/083,399

(22) Filed: Oct. 29, 2020

(65) Prior Publication Data

US 2021/0130225 A1    May 6, 2021

Related U.S. Application Data

(60) Provisional application No. 62/928,699, filed on Oct. 31, 2019.

(51) Int. Cl.
*C03C 10/00* (2006.01)
*C03C 21/00* (2006.01)
(Continued)

(52) U.S. Cl.
CPC .......... *C03C 10/0045* (2013.01); *C03C 3/085* (2013.01); *C03C 17/32* (2013.01);
(Continued)

(58) Field of Classification Search
None
See application file for complete search history.

(56) References Cited

U.S. PATENT DOCUMENTS 3,252,811 A    5/1966   Beall
3,524,748 A    8/1970   Beall
(Continued)

FOREIGN PATENT DOCUMENTS

FR    2477525 A1    9/1981

OTHER PUBLICATIONS

Allix et al: Highly Transparent BaAl4O7 PolycrystallinevCeramic Obtained by Full Crystallization of Glass, Adv. Mater. 2012, 24, 5570-5575, 2012.
(Continued)

*Primary Examiner* — David Sample
(74) *Attorney, Agent, or Firm* — John P. McGroarty (57) ABSTRACT

A glass-ceramic article includes 50 mol. % to 80 mol. % $SiO_2$; 10 mol. % to 25 mol. % $Al_2O_3$; 5 mol. % to 20 mol. % MgO; 0 mol. % to 10 mol. % $Li_2O$; and 1 mol. % to 3 mol. % of a nucleating agent. The nucleating agent is selected from the group consisting of $ZrO_2$, $TiO_2$, $SnO_2$, $HfO_2$, $Ta_2O_5$, $Nb_2O_5$, $Y_2O_3$, and combinations thereof. The nucleating agent may comprise greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof. The glass-ceramic article may have a molar ratio of MgO to $Li_2O$ of greater than or equal to 1:1. The glass-ceramic article may satisfy the relationship $0.85 \leq (MgO\ (mol\ \%) + Li_2O\ (mol\ \%))/Al_2O_3\ (mol\ \%) \leq 1.2$. The glass-ceramic article may comprise a crystalline phase comprising hexagonal stuffed β-quartz and glass.

18 Claims, 5 Drawing Sheets

(51) Int. Cl.
  *C03C 17/32* (2006.01)
  *C03C 3/085* (2006.01)
  *C03C 4/00* (2006.01)

(52) U.S. Cl.
  CPC .......... *C03C 21/001* (2013.01); *C03C 4/0092* (2013.01); *C03C 2204/00* (2013.01); *C03C 2214/12* (2013.01)

(56) References Cited

U.S. PATENT DOCUMENTS

| | | | |
|---|---|---|---|
| 3,573,077 | A | 3/1971 | Beall |
| 3,936,287 | A | 2/1976 | Beall et al. |
| 4,126,476 | A * | 11/1978 | Grossman ........... C03C 10/0027 501/4 |
| 9,446,982 | B2 | 9/2016 | Weiss et al. |
| 10,189,735 | B2 | 1/2019 | Beall et al. |
| 10,207,948 | B2 | 2/2019 | Schneider et al. |
| 10,239,780 | B2 | 3/2019 | Beall et al. |
| 2016/0280589 | A1 | 9/2016 | Beall et al. |
| 2018/0155235 | A1 | 6/2018 | Beall et al. |

OTHER PUBLICATIONS

Beall et al.(2016); Ion Exchange in Glass-Ceramics; Frontiers in Materials 3 (41), pp. 1-11.
Beall et al.: Crystallization and Chemical Strengthening of Stuffed β-Quartz Glass-Ceramics; J. Am/. Ceram Soc. 50(4) 1967.
Dittmer and Russel (2012) : Colorless and high strength MgO/Al2O3/SiO2 glass-ceramic dental material using zirconia as nucleating agent. J Biomed Materials Research—Part B Applied Biomaterials 100B (2) pp. 463-470.
Dittmer at al.(2011): Crystallization and mechanical properties of MgO/Al2O3/SiO2/ZrO2 glass-ceramics with and without the addition of yttria; Solid State Sciences, 13 (12) pp. 2146-2153.
Nakanishi et al.: Enhanced Light Storage of SrAl2O4 Glass Ceramics by Selective Europium Reduction, J. Am.Ceram. Soc. 98 (2) 423-429, 2015.
International Search Report and Written Opinion of the International Searching Authority; PCT/US2020/057275; dated Feb. 2, 2021; 10 pages; European Patent Office.

* cited by examiner

TRANSPARENT HEXAGONAL STUFFED β-QUARTZ GLASS-CERAMIC ARTICLES HAVING LARGE GRAIN SIZE

This application claims the benefit of priority under 35 U.S.C. § 119 of U.S. Provisional Application Ser. No. 62/928,699 filed on Oct. 31, 2019, the content of which is relied upon and incorporated herein by reference in its entirety.

BACKGROUND

Field

The present specification relates to glass precursors and glass-ceramic compositions and glass-ceramic articles made therefrom.

Technical Background

Glass articles, such as cover glasses, glass backplanes, and the like, are employed in both consumer and commercial electronic devices such as LCD and LED displays, computer monitors, automated teller machines (ATMs), and the like. Some of these glass articles may include "touch" functionality for which the glass article may be contacted by various objects including a user's fingers and/or stylus devices and, as such, the glass desirably should be sufficiently robust to endure regular contact without damage, such a scratching. Indeed, scratches introduced into the surface of the glass article may reduce the strength of the glass article as the scratches may serve as initiation points for cracks leading to catastrophic failure of the glass.

Moreover, such glass articles may also be incorporated in portable electronic devices, such as mobile telephones, personal media players, laptop computers, and tablet computers. As such, the optical characteristics of the glass article, such as the transmittance of the glass article, may be desirably considered.

Accordingly, a need exists for alternative materials to glass which have improved mechanical properties relative to glass while also having optical characteristics similar to glass.

SUMMARY

According to a first aspect A1, a glass-ceramic article may include: 50 mol % to 80 mol % $SiO_2$; 10 mol % to 25 mol % $Al_2O_3$; 5 mol % to 20 mol % MgO; 0 mol % to 10 mol % $Li_2O$; and 1 mol % to 3 mol % of a nucleating agent, the nucleating agent selected from the group consisting of $ZrO_2$, $TiO_2$, $SnO_2$, $HfO_2$, $Ta_2O_5$, $Nb_2O_5$, $Y_2O_3$, and combinations thereof, wherein: the nucleating agent comprises greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof; a molar ratio of MgO to $Li_2O$ is greater than or equal to 1:1; 0.85≤(MgO (mol %)+$Li_2O$ (mol %))/$Al_2O_3$ (mol %)≤1.2; and the glass-ceramic article comprises a crystalline phase comprising hexagonal stuffed β-quartz and glass.

A second aspect A2 includes the glass-ceramic article according to the first aspect A1, wherein the glass-ceramic article includes: 55 mol % to 65 mol % $SiO_2$; 18 mol % to 22 mol % $Al_2O_3$; 13 mol % to 16 mol % MgO; 2 mol % to 8 mol % $Li_2O$; and 1.5 mol % to 2.7 mol % of the nucleating agent.

A third aspect A3 includes the glass-ceramic article according to the first aspect A1 or the second aspect A2, wherein the glass-ceramic article includes 60 mol % to 65 mol % $SiO_2$; 16 mol % to 20 mol % $Al_2O_3$; 12 mol % to 15 mol % MgO; 4.0 mol % to 5.0 mol % $Li_2O$; and 1.5 mol % to 2.5 mol % of the nucleating agent.

A fourth aspect A4 includes the glass-ceramic article according to any of the first through third aspects A1-A3, wherein the molar ratio of MgO to $Li_2O$ is greater than or equal to 2:1.

A fifth aspect A5 includes the glass-ceramic article according to any of the first through fourth aspects A1-A4, wherein the crystalline phase comprises a stoichiometry of [MgO+$Li_2O$+ZnO]:0.8-1.25 $Al_2O_3$:2.0-8.0 $SiO_2$.

A sixth aspect A6 includes the glass-ceramic article according to any of the first through fifth aspects A1-A5, wherein the crystalline phase further comprises tetragonal zirconia.

A seventh aspect A7 includes the glass-ceramic article according to any of the first through sixth aspects A1-A6, further comprising ZnO.

An eighth aspect A8 includes the glass-ceramic article according to the seventh aspect A7, wherein MgO (mol %)+$Li_2O$ (mol %)+ZnO (mol %) is from 10 mol % to 28 mol %.

A ninth aspect A9 includes the glass-ceramic article according to the seventh aspect A7 or the eighth aspect A8, wherein ZnO (mol %)/(MgO (mol %)+$Li_2O$ (mol %)+ZnO (mol %)) is less than or equal to 0.5.

A tenth aspect A10 includes the glass-ceramic article according to any of the first through ninth aspects A1-A9, wherein the glass-ceramic article is substantially free of lithium.

An eleventh aspect A11 includes the glass-ceramic article according to any of the first through tenth aspects A1-A10, wherein the glass-ceramic article has a fracture toughness greater than or equal to 1.0 $MPa \cdot m^{1/2}$.

A twelfth aspect A12 includes the glass-ceramic article according to the eleventh aspect A11, wherein the fracture toughness is in the range of 1.0 $MPa \cdot m^{1/2}$ to 1.8 $MPa \cdot m^{1/2}$.

A thirteenth aspect A13 includes the glass-ceramic article according to any of the first through twelfth aspects A1-A12, wherein the glass-ceramic article has an average transmittance in a range from 75% to 95% of light over the wavelength range of 400 nm to 800 nm as measured at an article thickness of 0.85 mm.

A fourteenth aspect A14 includes the glass-ceramic article according to any of the first through thirteenth aspects A1-A13, wherein the glass-ceramic article has an average transmittance of greater than or equal to 75% of light over a wavelength range of 400 nm to 800 nm as measured at an article thickness of 0.85 mm.

A fifteenth aspect A15 includes the glass-ceramic article according to any of the first through fourteenth aspects A1-A14, wherein grains of the crystalline phase comprise a grain size in a range from greater than 5 μm to less than or equal to 75 μm.

A sixteenth aspect A16 includes the glass-ceramic article according to the fifteenth aspect A15, wherein the grain size is greater than or equal to 20 μm to less than or equal to 30 μm.

A seventeenth aspect A17 includes the glass-ceramic article according to any of the first through sixteenth aspects A1-A16, wherein the glass-ceramic article comprises greater than or equal to 50 wt % of the crystalline phase and less than or equal to 50 wt % glass.

An eighteenth aspect A18 includes the glass-ceramic article according to any of the first through seventeenth aspects A1-A17, wherein the glass-ceramic article has a liquidus viscosity of greater than 1 kilopoise (kP).

A nineteenth aspect A19 includes the glass-ceramic article according to any of the first through eighteenth aspects A1-A18, wherein the glass-ceramic article comprises microcracks in the glass.

A twentieth aspect A20 includes the glass-ceramic article according to the nineteenth aspect A19, wherein the glass-ceramic article has a fracture toughness greater than or equal to 1.8 MPa·m$^{1/2}$.

A twenty-first aspect A21 includes the glass-ceramic article according to the nineteenth aspect A19 or the twentieth aspect A20, further comprising a polymer filler disposed in the microcracks.

A twenty-second aspect A22 includes the glass-ceramic article according to the twenty-first aspect A21, wherein the polymer filler comprises an index of refraction greater than or equal to 1.51 and less than or equal to 1.58.

A twenty-third aspect A23 includes the glass-ceramic article according to the twenty-first aspect A21 or the twenty-second aspect A22, wherein the glass-ceramic article comprising the microcracks filled with the polymer filler has a fracture toughness of greater than or equal to 2.0 MPa·m$^{1/2}$.

According to a twenty-fourth aspect A24, a method of forming a glass-ceramic article includes heating a glass-ceramic composition at a rate in a range from 1° C./min to 10° C./min to a glass pre-nucleation temperature, wherein the glass-ceramic composition comprises: 50 mol % to 80 mol % SiO$_2$; 10 mol % to 25 mol % Al$_2$O$_3$; 5 mol % to 20 mol % MgO; 0 mol % to 10 mol % Li$_2$O; and 1 mol % to 3 mol % of a nucleating agent, the nucleating agent selected from the group consisting of ZrO$_2$, TiO$_2$, SnO$_2$, HfO$_2$, Ta$_2$O$_5$, Nb$_2$O$_5$, Y$_2$O$_3$, and combinations thereof, wherein: the nucleating agent comprises greater than or equal to 50% ZrO$_2$ and less than 50% of at least one compound selected from the group consisting of TiO$_2$, SnO$_2$, HfO$_2$, Ta$_2$O$_5$, Nb$_2$O$_5$, Y$_2$O$_3$, and combinations thereof; molar ratio of MgO to Li$_2$O is greater than or equal to 1:1; 0.85≤(MgO (mol %)+Li$_2$O (mol %))/Al$_2$O$_3$ (mol %)≤1.2; maintaining the glass-ceramic composition at the pre-nucleation temperature for a time in a range of 0.25 hour to 4 hours to produce a pre-nucleated crystallizable glass; heating the pre-nucleated crystallizable glass at a rate in a range from 1° C./min to 10° C./min to a nucleation temperature (Tn); maintaining the pre-nucleated crystallizable glass at the nucleation temperature for a time in the range from between 0.25 hour to 4 hours to produce a nucleated crystallizable glass; heating the nucleated crystallizable glass at a rate in a range from 1° C./min to 10° C./min to a crystallization temperature (Tc); maintaining the nucleated crystallizable glass at the crystallization temperature for a time in a range from 0.25 hour to 4 hour to produce the glass-ceramic article; and cooling the glass ceramic article to room temperature.

A twenty-fifth aspect A25 includes the method according to the twenty-fourth aspect A24, wherein the crystallization temperature (Tc) is in the range of 850° C. to 1000° C.

A twenty-sixth aspect A26 includes the method according to the twenty-fourth aspect A24 or the twenty-fifth aspect A25, further comprising strengthening the glass ceramic article in an ion-exchange bath.

A twenty-seventh aspect A27 includes the method according to the twenty-sixth aspect A26, wherein the ion-exchange bath comprises molten Li$_2$SO$_4$ salt.

A twenty-eighth aspect A28 includes the method according to the twenty-seventh aspect A27, wherein the ion-exchange bath further comprises molten K$_2$SO$_4$ salt.

A twenty-ninth aspect A29 includes a consumer electronic device, comprising: a housing having a front surface, a back surface, and side surfaces; electrical components provided at least partially within the housing, the electrical components including at least a controller, a memory, and a display, the display being provided at or adjacent the front surface of the housing; and the glass-ceramic article according to any of the first through twenty-third aspects A1-A23 disposed over the display.

Additional features and advantages of the glass-ceramics described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of glass-ceramic articles having large grain size.

According to embodiments, a glass-ceramic article includes: 50 mol. % to 80 mol. % $SiO_2$; 10 mol. % to 25 mol. % $Al_2O_3$; 5 mol. % to 20 mol. % MgO; 0 mol. % to 10 mol. % $Li_2O$; and 1 mol. % to 3 mol. % of a nucleating agent, the nucleating agent selected from the group consisting of $ZrO_2$, $TiO_2$, $SnO_2$, $HfO_2$, $Ta_2O_5$, $Nb_2O_5$, $Y_2O_3$, and combinations thereof. The nucleating agent comprises greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof. The glass-ceramic article may have a molar ratio of MgO to $Li_2O$ of greater than or equal to 1:1. The glass-ceramic article may satisfy the relationship $0.85 \leq (MgO$ (mol %)$+Li_2O$ (mol %))$/Al_2O_3$ (mol %)$\leq 1.2$. The glass-ceramic article may comprise a crystalline phase comprising hexagonal stuffed β-quartz and glass. Various embodiments of glass-ceramic articles and methods of making glass-ceramic articles will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The terms "0 mol %," "free," and "substantially free," when used to describe the concentration and/or absence of a particular constituent component in a glass precursor or glass-ceramic composition, means that the constituent component is not intentionally added to the glass precursor or glass-ceramic composition. However, the glass precursor or class-ceramic composition may contain traces of the constituent component as a contaminant or tramp in amounts of less than 0.05 mol %.

In the embodiments of the glass precursors or glass-ceramic compositions described herein, the concentrations of constituent components (e.g., $SiO_2$, $Al_2O_3$, and the like) are specified in mole percent (mol %) on an oxide basis, unless otherwise specified.

The fracture toughness is measured using the double torsion technique described in ASTM STP 559, entitled, "Double Torsion Technique as a Universal Fracture Toughness Test Method," the contents of which are incorporated herein by reference in their entirety.

X-ray diffraction (XRD) spectrum, as described herein, is measured with a D8 ENDEAVOR X-ray Diffraction system with a LYNXEYE XE-T detector manufactured by Bruker Corporation (Billerica, Mass.).

Transmittance data (total transmittance and diffuse transmittance) is measured with a Lambda 950 UV/Vis Spectrophotometer manufactured by PerkinElmer Inc. (Waltham, Mass. USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. For diffuse transmittance (Diffuse Tx), the Spectralon® reference reflectance disk over the sphere exit port is removed to allow on-axis light to exit the sphere and enter a light trap. A zero offset measurement is made, with no sample, of the diffuse portion to determine efficiency of the light trap. To correct diffuse transmittance measurements, the zero offset contribution is subtracted from the sample measurement using the equation: Diffuse Tx=$Diffuse_{Measured}$−(Zero Offset*(Total Tx/100)). The percentage of scatter (i.e., % Scatter) is measured as: (% Diffuse Tx/% Total Tx)*100.

The term "average transmittance," as used herein, refers to the average of transmittance measurements at various wavelengths within a given wavelength range. Unless otherwise specified, "average transmittance" across a range is calculated by measuring the transmittance of all whole number wavelengths within the range, including endpoints, and averaging the measurements. In the embodiments described herein, the "average transmittance" is reported over the wavelength range from 400 nm to 800 nm (inclusive of endpoints).

The term "transparent," when used to describe an article herein, refers to an article that has an average transmittance of at least 75% for a light in a wavelength range from 400 nm to 800 nm (inclusive of endpoints) at an article thickness of 0.85 mm.

The term "translucent," when used to describe an article herein, refers to an article that has a transmittance in a range from 20% to less than 75% for light in a wavelength range from 400 nm to 800 nm (inclusive of endpoints) at an article thickness of 0.85 mm.

The grain size of the grains of the crystalline phase of the glass-ceramics described herein are measured using a scanning electron microscopy.

The term "melting point," as used herein, refers to the temperature at which the viscosity of the glass precursor or glass-ceramic composition is 200 poise.

The term "softening point," as used herein, refers to the temperature at which the viscosity of the glass precursor or glass-ceramic composition is $1 \times 10^{7.6}$ poise. The softening point is measured according to the parallel plate viscosity method which measures the viscosity of inorganic glass from $10^7$ to $10^9$ poise as a function of temperature, similar to ASTM C1351M.

The term "liquidus viscosity," as used herein, refers to the viscosity of the glass-ceramic at the onset of devitrification (i.e., at the liquidus temperature as determined with the gradient furnace method according to ASTM C829-81).

Unless otherwise specified, compressive stress (including surface compressive stress) is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" and "DOC" refer to the position in the glass-ceramic where compressive stress transitions to tensile stress.

The phrase "glass precursor", as used herein, refers to a glass or glass article containing one or more nucleating agents which, upon thermal treatment, causes the nucleation of a crystal phase in the glass.

The phrase "glass-ceramic", as used herein, refers to a material or article formed from a glass precursor material following nucleation of the crystal phase in the glass precursor.

Articles formed from glass-ceramics generally have improved fracture toughness relative to articles formed from glass due to the presence of crystalline grains which impede crack growth. The fracture toughness may be improved by decreasing the number of grains per unit volume of the glass-ceramic—that is by increasing the grain size of the glass-ceramic. While not wishing to be bound by theory, it is believed that the improved fracture toughness is due to the larger amount of energy it takes to pull out grains with increased grain size. However, the transparency or optical transmission decreases with increasing grain size. In particular, it has been found that the transparency of glass-ceramics is significantly reduced when the grain size is larger than 5 μm. Thus, conventional glass-ceramics may have relatively good mechanical properties (such as fracture toughness) and relatively poor optical characteristics (such as optical transparency or optical transmittance) or relatively poor mechanical properties and relatively good optical characteristics, but not relatively good mechanical properties and relatively good optical characteristics.

Disclosed herein are glass precursors and glass-ceramics formed therefrom which mitigate the aforementioned problems. Specifically, the glass precursors and glass-ceramics formed therefrom disclosed herein comprise a relatively low concentration of nucleating agent, which results in transparent glass-ceramics having relatively larger grain sizes and, thus, relatively greater values of fracture toughness while also having relatively good optical characteristics.

The glass precursors and glass-ceramics described herein may be generally described as magnesium-containing aluminoslicate glass precursors or glass-ceramics and comprise $SiO_2$, $Al_2O_3$, MgO and a nucleating agent, such as $ZrO_2$. In addition to $SiO_2$, $Al_2O_3$, MgO, and a nucleating agent, the glass precursors and glass-ceramics described herein may further contain alkali oxides, such as $Li_2O$, to enable the ion-exchangeability of the glass-ceramics. The glass-ceramics described herein may include a crystalline phase comprising hexagonal stuffed β-quartz and glass. In embodiments, the crystalline phase may further include tetragonal zirconia. In embodiments, the glass-ceramics include greater than or equal to 50 wt % of the crystalline phase by weight of the glass article (i.e., wt %) and less than or equal to 50 wt % glass, greater than or equal to 60 wt % of the crystalline phase and less than or equal to 40 wt % glass, greater than or equal to 70 wt % of the crystalline phase and less than or equal to 30 wt % glass, greater than or equal to 80 wt % of the crystalline phase and less than or equal to 20 wt % glass, greater than or equal to 90 wt % of the crystalline phase and less than or equal to 10 wt % glass, greater than or equal to 95 wt % of the crystalline phase and less than or equal to 5 wt % glass, greater than or equal to 96 wt % of the crystalline phase and less than or equal to 4 wt % glass, greater than or equal to 97 wt % and less than or equal to 3 wt % glass, greater than or equal to 98 wt % of the crystalline phase and less than or equal to 2 wt % glass, or greater than or equal to 99 wt % of the crystalline phase and less than or equal to 1 wt % glass as determined according to Rietveld analysis of the XRD spectrum. It should be understood that the crystalline phase content or the glass content may be within a sub-range formed from any and all of the foregoing endpoints. In embodiments, the glass-ceramics described herein may further include a nucleating phase. The nucleating phase may contain $ZrO_2$, zirconium titanate, yttrium tantalite, niobate, and combinations thereof.

$SiO_2$ is the primary glass former in the glass precursors and glass-ceramic compositions described herein and may function to stabilize the network structure of the glass-ceramics. The concentration of $SiO_2$ in the glass precursors and glass-ceramic compositions should be sufficiently high (e.g., greater than or equal to 50 mol %) in order to form the crystalline phase when the glass precursor is heat-treated to convert the glass precursor to a glass-ceramic. The amount of $SiO_2$ may be limited (e.g., to less than or equal to 80 mol %) to control the melting point of the glass precursor or glass-ceramic composition, as the melting temperature of pure $SiO_2$ or high-$SiO_2$ glasses is undesirably high. Thus, limiting the concentration of $SiO_2$ may aid in improving the meltability and the formability of the glass precursor or glass-ceramic composition.

Accordingly, in embodiments, the glass precursor or glass-ceramic composition may comprise from 50 to 80 mol % $SiO_2$. In embodiments, the glass precursor or glass-ceramic composition may comprise from 55 to 65 mol % $SiO_2$. In embodiments, the glass precursor or glass-ceramic composition may comprise from 60 to 65 mol % $SiO_2$. In embodiments, the concentration of $SiO_2$ in the glass or glass-ceramic composition may be from 50 to 80 mol %, from 50 to 77 mol %, from 50 to 75 mol %, from 50 to 73 mol %, from 50 to 70 mol %, from 50 to 67 mol %, from 50 to 65 mol %, from 50 to 63 mol %, from 50 to 60 mol %, from 50 to 59 mol %, from 53 to 80 mol %, from 53 to 77 mol %, from 53 to 75 mol %, from 53 to 73 mol %, from 53 to 70 mol %, from 53 to 67 mol %, from 53 to 65 mol %, from 53 to 63 mol %, from 53 to 60 mol %, from 53 to 59 mol %, from 55 to 80 mol %, from 55 to 77 mol %, from 55 to 75 mol %, from 55 to 73 mol %, from 55 to 70 mol %, from 55 to 67 mol %, from 55 to 65 mol %, from 55 to 63 mol %, from 55 to 60 mol %, from 55 to 59 mol %, from 57 to 80 mol %, from 57 to 77 mol %, from 57 to 75 mol %, from 57 to 73 mol %, from 57 to 70 mol %, from 57 to 67 mol %, from 57 to 65 mol %, from 57 to 63 mol %, from 57 to 60 mol %, or from 57 to 59 mol %, or any and all sub-ranges formed from any of these endpoints. In embodiments, the concentration of $SiO_2$ in the glass or glass-ceramic composition may be greater than or equal to 50 mol %, greater than or equal to 53 mol %, greater than or equal to 55 mol %, or greater than or equal to 57 mol %. In embodiments, the concentration of $SiO_2$ in the glass or glass-ceramic composition may be less than or equal to 80 mol %, less than or equal to 75 mol %, less than or equal to 70 mol %, less than or equal to 65 mol %, less than or equal to 63 mol %, or less than or equal to 60 mol %.

Like $SiO_2$, $Al_2O_3$ may also stabilize the glass network and additionally provides improved mechanical properties and chemical durability to the glass-ceramics. The amount of $Al_2O_3$ may also be tailored to the control the viscosity of the glass precursor or glass-ceramic composition. However, if the amount of $Al_2O_3$ is too high, the viscosity of the melt may increase. In embodiments, the glass precursor or glass-ceramic composition may comprise from 10 to 25 mol % $Al_2O_3$. In embodiments, the glass precursor or glass-ceramic composition may comprise from 18 to 22 mol % $Al_2O_3$. In embodiments, the glass precursor or glass-ceramic composition may comprise from 16 to 20 mol % $Al_2O_3$. In embodiments, the concentration of $Al_2O_3$ in the glass precursor or glass-ceramic composition may be from 10 to 25 mol %, from 10 to 23 mol %, from 10 to 20 mol %, from 15 to 25 mol %, from 15 to 23 mol %, 15 to 20 mol %, 18 to 25 mol %, 18 to 23 mol %, 18 to 22 mol %, 18 to 21 mol %, 18 to 20 mol %, 20 to 25 mol %, 20 to 24 mol %, 20 to 23 mol %, 20 to 22 mol %, or 20 to 21 mol %, or any and all sub-ranges formed from any of these endpoints. In embodiments, the concentration of $Al_2O_3$ in the glass precursor or glass-ceramic composition may be greater than or equal to 10 mol %, greater than or equal to 15 mol %, greater than or equal to 18 mol %, or greater than or equal to 20 mol %. In embodiments, the concentration of $Al_2O_3$ in the glass precursor or glass-ceramic composition may be less than or equal to 25 mol %, less than or equal to 23 mol %, or less than or equal to 20 mol %.

MgO in the glass precursor or glass-ceramic composition may aid in charge balancing the $Al_2O_3$ in the glass precursor, either by itself or in conjunction with $Li_2O$. Charge balancing the $Al_2O_3$ aids in achieving the desired crystalline phase (and the amount of the crystalline phase) in the glass-ceramic, as will be described in further detail herein. MgO may enter and stuff hexagonal channels of the crystalline phase of the glass-ceramic in a partial solid solution (hence the "hexagonal stuffed β-quartz" crystalline phase of the glass-ceramic). In embodiments, the glass precursor or glass-ceramic composition may comprise from 10 to 20 mol % MgO. In embodiments, the glass precursor or glass-ceramic composition may comprise from 13 to 16 mol % MgO. In embodiments, the glass precursor or glass-ceramic composition may comprise from 12 to 15 mol % MgO. In embodiments, the concentration of MgO in the glass precursor or glass-ceramic composition may be from 5 to 20 mol %, from 5 to 15 mol %, from 5 to 10 mol %, from 10 to 20 mol %, from 10 to 17 mol %, from 10 to 15 mol %, from 10 to 13 mol %, from 12 to 20 mol %, from 12 to 17 mol %, from 12 to 15 mol %, from 12 to 14 mol %, from 12 to 13 mol %, from 13 to 20 mol %, from 13 to 17 mol %, from 13 to 16 mol %, from 13 to 15 mol %, or from 13 to 14 mol %, or any and all sub-ranges formed from any of these endpoints. In embodiments, the concentration of MgO in the glass precursor or glass-ceramic composition may be greater than or equal to 5 mol %, greater than or equal to 10 mol %, or greater than or equal to 12 mol %. In embodiments, the concentration of MgO in the glass precursor or glass-ceramic composition may be less than or equal to 20 mol %, less than or equal to 17 mol %, or less than or equal to 15 mol %.

$Li_2O$ aids in forming the crystalline phase. $Li_2O$, in conjunction with MgO, may aid in charge balancing the $Al_2O_3$ in the glass precursor or glass-ceramic composition. As noted herein, charge balancing the $Al_2O_3$ aids in achieving the desired crystalline phase (and the amount of the crystalline phase) in the glass-ceramic. In addition, it has been found that $Li_2O$ has a pronounced effect on reducing the melting point, softening point, and molding temperature of the glass precursors or glass-ceramic compositions and, as such, $Li_2O$ is effective at offsetting the reduction in formability of the glass-precursor or glass-ceramic composition due to the inclusion of, for example and without limitation, higher concentrations of $SiO_2$. Moreover, either by itself or in conjunction with MgO, $Li_2O$ may enter and stuff hexagonal channels of the crystalline phase of the glass-ceramic in a partial solid solution (hence the "hexagonal stuffed β-quartz" crystalline phase of the glass-ceramic). In embodiments, the glass precursor or glass-ceramic composition may comprise from 0 to 10 mol % $Li_2O$. In embodiments, the glass precursor or glass-ceramic composition may comprise from 2 to 8 mol % $Li_2O$. In embodiments, the glass precursor or glass-ceramic composition may comprise from 4.0 to 5.0 $Li_2O$. In embodiments, the concentration of $Li_2O$ in the glass precursor or glass-ceramic composition may be from 0 to 10 mol %, 0 to 9 mol %, 0 to 8 mol %, from 0 to 7 mol %, from 0 to 6 mol %, from 0 to 5 mol %, from 2 to 10 mol %, from 2 to 9 mol %, from 2 to 8 mol %, from 2 to 7 mol %, from 2 to 6 mol %, from 2 to 5 mol %, from 3 to 10 mol %, from 3 to 9 mol %, from 3 to 8 mol %, from 3 to 7 mol %, from 3 to 6 mol %, from 3 to 5 mol %, from 4.0 to 10.0 mol %, from 4.0 to 9.0 mol %, from 4.0 to 8.0 mol %, from 4.0 to 7.0 mol %, from 4.0 to 6.0 mol %, from 4.0 to 5.5 mol %, from 4.0 to 5.0 mol %, from 4.5 to 10.0 mol %, from 4.5 to 9.0 mol %, from 4.5 to 8.0 mol %, from 4.5 to 7.0 mol %, from 4.5 to 6.0 mol %, from 4.5 to 5.5 mol %, or from 4.5 to 5.0 mol %, or any and all sub-ranges formed from any of these endpoints. In embodiments, the concentration of $Li_2O$ in the glass precursor or glass-ceramic composition may be greater than or equal to 0 mol % or greater than or equal to 2 mol %. In embodiments, the concentration of $Li_2O$ in the glass precursor or glass-ceramic composition may be less than or equal to 10 mol % or less than or equal to 5 mol %.

If the concentration of $Li_2O$ is too high, such as greater than 10 mol %—the glass precursor or glass-ceramic composition becomes very fluid and the delivery viscosity is low enough that a sheet cannot be formed with certain forming techniques. As such, in embodiments, the glass precursor or glass-ceramic composition is substantially free of lithium. In embodiments, as the concentration of $Li_2O$ approaches 0 mol %, the concentration of $ZrO_2$ may be increased to produce a coarse-grained glass-ceramic.

In embodiments of the glass precursor or glass-ceramic composition described herein, a molar ratio of the amount of MgO in the glass precursor or glass-ceramic composition to the amount of $Li_2O$ in the glass precursor or glass-ceramic composition (i.e., MgO (mol %):$Li_2O$ (mol %)) may be greater than or equal to 1:1 to produce coarse grains without cracking. In embodiments, the ratio MgO (mol %):$Li_2O$ (mol %) in the glass precursor or glass-ceramic composition may be from 1.5:1 to 3:1. In embodiments, the ratio MgO (mol %):$Li_2O$ (mol %) in the glass precursor or glass-ceramic composition may be greater than or equal to 1:1, greater than or equal 1.5:1, greater than or equal to 2:1, greater than or equal to 2.5:1, or greater than or equal to 3:1.

In embodiments, the glass precursor or glass-ceramic compositions described herein may satisfy the relationship $0.85 \leq (MgO\ (mol\ \%) + Li_2O\ (mol\ \%))/Al_2O_3\ (mol\ \%) \leq 1.2$. As noted above, MgO and $Li_2O$ may be used to charge balance the $Al_2O_3$ in the glass precursor or glass-ceramic composition and thereby achieve the desired crystalline phase (and the amount of the crystalline phase) in the glass-ceramic. In particular, when the ratio of (MgO (mol %)+Li$_2$O (mol %))/Al$_2$O$_3$ (mol %) in the glass precursor or glass-ceramic composition is greater than 1.2, the crystalline phase may be mullite in addition to hexagonal stuffed β-quartz. When the crystalline phase includes mullite, the glass-ceramic may be susceptible to haze whereby the optical properties of the glass-ceramic, such as transmittance, are degraded. When the ratio of (MgO (mol %)+Li$_2$O (mol %))/Al$_2$O$_3$ (mol %) in the glass precursor or glass-ceramic composition is less than 0.85, the glass amount of glass in the glass ceramic increases and the amount of crystalline phase decreases, which is undesirable. In embodiments, the glass precursor or glass-ceramic composition may satisfy the relationship 0.85≤(MgO (mol %)+Li$_2$O (mol %))/Al$_2$O$_3$ (mol %)≤1.2; 0.90≤(MgO (mol %)+Li$_2$O (mol %))/Al$_2$O$_3$ (mol %)≤1.2; 0.95≤(MgO (mol %)+Li$_2$O (mol %))/Al$_2$O$_3$ (mol %)≤1.2; 0.85≤(MgO (mol %)+Li$_2$O (mol %))/Al$_2$O$_3$ (mol %)≤1.0; 0.90≤(MgO (mol %)+Li$_2$O (mol %))/Al$_2$O$_3$ (mol %)≤1.0; or 0.95≤(MgO (mol %)+Li$_2$O (mol %))/Al$_2$O$_3$ (mol %)≤1.0.

In embodiments, the crystalline phase of the glass precursors or glass-ceramic compositions described herein may comprise a stoichiometry of [MgO+Li$_2$O]:Al$_2$O$_3$:2.0-7.0 SiO$_2$ to maintain stability by controlling the liqidus temperature and the crystallization of the glass precursor or glass-ceramic compositions. In embodiments, the glass precursors or glass-ceramic compositions described herein may comprise a stoichiometry of [MgO+Li$_2$O]:Al$_2$O$_3$:2.0-6.0 SiO$_2$. In embodiments, the glass precursors or glass-ceramic compositions described herein may comprise a stoichiometry of [MgO+Li$_2$O]:Al$_2$O$_3$:2.0-5.0 SiO$_2$. In embodiments, the glass precursors or glass-ceramic compositions described herein may comprise a stoichiometry of [MgO+Li$_2$O]:Al$_2$O$_3$:2.5-5.0 SiO$_2$. In embodiments, the glass precursors or glass-ceramic compositions described herein may comprise a stoichiometry of [MgO+Li$_2$O]:Al$_2$O$_3$:2.5-4.5 SiO$_2$.

In embodiments, the crystalline phase of the glass precursors or glass-ceramic compositions described herein may comprise a stoichiometry of [MgO+Li$_2$O+ZnO]:0.8-1.25 Al$_2$O$_3$:2.0-8.0 SiO$_2$ to maintain stability by controlling the liqidus temperature and the crystallization of the glass precursor or glass-ceramic compositions. In embodiments, the glass precursors or glass-ceramic compositions described herein may comprise a stoichiometry of [MgO+Li$_2$O+ZnO]:0.9-1.1 Al$_2$O$_3$:2.5-6.0 SiO$_2$.

As noted herein, the glass precursor and glass-ceramic compositions further include a nucleating agent. The nucleating agent functions to produce bulk nucleation of the crystalline phase in the glass, thereby transforming the glass into a glass-ceramic. If the concentration of the nucleating agent is too low—such as lower than 1 mol %—nucleation will not occur. However, if the concentration of the nucleating agent is too high—such as greater than 3 mol %—the resulting grain size of the crystalline grains in the resultant glass-ceramic may be too fine (e.g., too small) to obtain the desired mechanical properties such as fracture toughness. Accordingly, the desired grain size (as described further hereinbelow) is obtained, at least in part, by including some concentration of nucleating agent in the glass precursor or glass-ceramic composition, but minimizing the concentration of nucleating agent to encourage the nucleation of fewer—and larger—grains. In embodiments, the glass precursor or glass-ceramic composition may comprise from 1 to 3 mol % of the nucleating agent. In embodiments, the glass precursor or glass-ceramic composition may comprise from 1.5 to 2.7 mol % of the nucleating agent. In embodiments, the glass precursor or glass-ceramic composition may comprise from 1.5 to 2.5 mol % of the nucleating agent. In embodiments, the concentration of the nucleating agent in the glass precursor or glass-ceramic composition may be from 1 to 3 mol %, from 1 to 2.7 mol %, from 1 to 2.5 mol %, from 1 to 2.3 mol %, from 1 to 2 mol %, from 1.5 to 3 mol %, from 1.5 to 2.7 mol %, from 1.5 to 2.5 mol %, from 1.5 to 2.3 mol %, from 1.5 to 2 mol %, from 1.7 to 3 mol %, from 1.7 to 2.7 mol %, from 1.7 to 2.5 mol %, from 1.7 to 2.3 mol %, from 1.7 to 2 mol %, from 1.8 to 3 mol %, from 1.8 to 2.7 mol %, from 1.8 to 2.5 mol %, from 1.8 to 2.3 mol %, from 1.8 to 2.2 mol %, from 1.8 to 2.1 mol %, from 1.8 to 2 mol %, from 2 to 3 mol %, from 2 to 2.7 mol %, from 2 to 2.6 mol %, or from 2 to 2.5 mol %, or any and all sub-ranges formed from any of these endpoints. In embodiments, the concentration of the nucleating agent in the glass precursor or glass-ceramic composition may be greater than or equal to 1 mol % or greater than or equal to 1.5 mol %. In embodiments, the concentration of the nucleating agent in the glass precursor or glass-ceramic composition may be less than or equal to 3 mol %, less than or equal to 2.7 mol %, or less than or equal to 2.5 mol %.

In embodiments, the nucleating agent is selected from the group consisting of ZrO$_2$, TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 50% ZrO$_2$ and less than 50% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 55% ZrO$_2$ and less than 45% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 60% ZrO$_2$ and less than 40% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 65% ZrO$_2$ and less than 35% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 70% ZrO$_2$ and less than 30% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 75% ZrO$_2$ and less than 25% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 80% ZrO$_2$ and less than 20% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 85% ZrO$_2$ and less than 15% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 90% ZrO$_2$ and less than 10% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise greater than or equal to 95% ZrO$_2$ and less than 5% of at least one compound selected from the group consisting of TiO$_2$, SnO$_2$, HfO$_2$, Ta$_2$O$_5$, Nb$_2$O$_5$, Y$_2$O$_3$, and combinations thereof. In embodiments, the nucleating agent may comprise 100% $ZrO_2$.

In embodiments, the glass precursor or glass-ceramic compositions described herein may include ZnO. Like MgO, ZnO may enter and stuff hexagonal channels of the crystalline phase of the glass-ceramic in a partial solid solution. Further, ZnO may assist MgO and $Li_2O$ in charge balancing the $Al_2O_3$ in the composition and thereby achieve the desired crystalline phase (and the amount of the crystalline phase) in the glass-ceramic. As such, at least a portion of the MgO content may be replaced with ZnO. In embodiments, the glass precursor or glass-ceramic composition may comprise from 0 to 15 mol % ZnO. In embodiments, the concentration of ZnO in the glass precursor or glass-ceramic composition may be from 0 to 15 mol %, from 0 to 10 mol %, from 0 to 9 mol %, from 0 to 8 mol %, from 0 to 7 mol %, from 0 to 6 mol %, from 0 to 5 mol %, from 0 to 4 mol %, from 0 to 3 mol %, from 0 to 2 mol %, from 0 to 1 mol %, from 1 to 15 mol %, from 1 to 10 mol %, from 1 to 9 mol %, from 1 to 8 mol %, from 1 to 7 mol %, from 1 to 6 mol %, from 1 to 5 mol %, from 1 to 4 mol %, from 1 to 3 mol %, from 1 to 2 mol %, from 2 to 15 mol %, from 2 to 10 mol %, from 2 to 9 mol %, from 2 to 8 mol %, from 2 to 7 mol %, from 2 to 6 mol %, from 2 to 5 mol %, from 2 to 4 mol %, from 2 to 3 mol %, from 10 to 15 mol %, from 10 to 12 mol %, or from 12 to 15 mol %, or any and all sub-ranges formed from any of these endpoints. In embodiments, the concentration of ZnO in the glass precursor or glass-ceramic composition may be greater than or equal to 0 mol %, greater than or equal to 1 mol %, greater than or equal to 2 mol %, or greater than or equal to 10 mol %. In embodiments, the concentration of ZnO in the glass precursor or glass-ceramic composition may be less than or equal to 15 mol %, less than or equal to 12 mol %, less than or equal to 10 mol %, or less than or equal to 5 mol %.

In embodiments, the total amount of MgO (mol %)+$Li_2O$ (mol %)+ZnO (mol %) in the glass precursors or glass-ceramic compositions described herein may be from 10 mol % to 28 mol %.

In embodiments, ZnO (mol %)/(MgO (mol %)+$Li_2O$ (mol %)+ZnO (mol %)) in the glass precursors or glass-ceramic compositions described herein may be less than or equal to 0.5. This relationship contributes to the transparency and refractive index of the glass precursors or glass-ceramic compositions. MgO has better isotropic properties as far as refractive index. ZnO acts more like LiO in terms of transparency. In embodiments, Zn (mol %)/(MgO (mol %)+$Li_2O$ (mol %)+ZnO (mol %)) in the glass precursors or glass-ceramic compositions described herein may be less than or equal to 0.2.

In embodiments, the glass precursors or glass-ceramic compositions described herein may further include tramp materials such as $TiO_2$, MnO, $MoO_3$, $WO_3$, $Y_2O_3$, $La_2O_3$, CdO, $As_2O_3$, $Sb_2O_3$, sulfur-based compounds, such as sulfates, halogens, or combinations thereof. In embodiments, antimicrobial components, chemical fining agents, or other additional components may be included in the glass precursors or glass-ceramic compositions.

The articles formed from the glass precursor or glass-ceramics described herein may be any suitable thickness, which may vary depending on the particular application for use of the glass-ceramic. Glass-ceramic sheet embodiments may have a thickness of from 0.4 mm to 10 mm. In embodiments, the glass-ceramic sheet embodiments may have a thickness of 6 mm or less, 5 mm or less, 4 mm or less, 3 mm or less, 2 mm or less, 1.0 mm or less, 750 µm or less, 500 µm or less, or 250 µm or less. In embodiments, the glass-ceramic sheet embodiments may have a thickness of from 100 µm to 2 mm, 100 µm to 4 mm, 100 µm to 5 mm, 200 µm to 5 mm, from 500 µm to 5 mm, from 200 µm to 4 mm, from 200 µm to 2 mm, from 400 µm to 5 mm, or from 400 µm to 2 mm. In embodiments, the glass-ceramic sheet embodiments may have a thickness from 3 mm to 6 mm or from 0.8 mm to 3 mm. It should be understood that the thickness of the article may be within a sub-range formed from any and all of the foregoing endpoints.

In embodiments, the glass-ceramics described herein exhibit high fracture toughness ($K_{1c}$) and enhanced damage resistance due to the relatively large grain size of the glass-ceramics. In embodiments, grains of the crystalline phase of the glass-ceramics described herein may comprise a grain size in a range from greater than 5 µm to less than or equal to 75 µm. In embodiments, the grain size of the glass-ceramics described herein may be in a range from greater than or equal to 20 µm to less than or equal to 30 µm. In embodiments, the grain size of the glass-ceramics described herein may be in a range from greater than 5 µm to less than or equal to 75 µm, from greater than or equal to 10 µm to less than or equal to 75 µm, from greater than or equal to 20 µm to less than or equal to 75 µm, from greater than or equal to 30 µm to less than or equal to 75 µm, from greater than or equal to 40 µm to less than or equal to 75 µm, from greater than 5 µm to less than or equal to 50 µm, from greater than or equal to 10 µm to less than or equal to 50 µm, from greater than or equal to 20 µm to less than or equal to 50 µm, from greater than or equal to 30 µm to less than or equal to 50 µm, from greater than or equal to 40 µm to less than or equal to 50 µm, from greater than 5 µm to less than or equal to 40 µm, from greater than or equal to 10 µm to less than or equal to 40 µm, from greater than or equal to 20 µm to less than or equal to 40 µm, from greater than or equal to 30 µm to less than or equal to 40 µm, from greater than 5 µm to less than or equal to 30 µm, from greater than or equal to 10 µm to less than or equal to 30 µm, or from greater than or equal to 20 µm to less than or equal to 30 µm, or any and all sub-ranges formed from any of these endpoints.

In embodiments, the glass-ceramics may have a fracture toughness ($K_{1c}$) of greater than or equal to 1.0 MPa·m$^{1/2}$. In embodiments, the glass-ceramics may have a fracture toughness of greater than or equal to 1.0 MPa·m$^{1/2}$, greater than or equal to 1.2 MPa·m$^{1/2}$, greater than or equal to 1.3 MPa·m$^{1/2}$, greater than or equal to 1.4 MPa·m$^{1/2}$, greater than or equal to 1.5 MPa·m$^{1/2}$, greater than or equal to 1.6 MPa·m$^{1/2}$, greater than or equal to 1.7 MPa·m$^{1/2}$, or greater than or equal to 1.8 MPa·m$^{1/2}$. In embodiments, the glass-ceramics may have a fracture toughness in the range of from 1.0 to 1.8 MPa·m$^{1/2}$ or 1.0 to 1.5 MPa·m$^{1/2}$. It should be understood that the fracture toughness of the glass-ceramics may be within a sub-range formed from any and all of the foregoing endpoints.

In embodiments, a glass-ceramic may have an average transmittance in a range from 75% to 95% of light over the wavelength range of 400 nm to 800 nm for a glass-ceramic article having an article thickness of 0.85 mm. In embodiments, the glass-ceramic may have an average transmittance in a range from 75% to 95%, from 80% to 95%, from 85% to 95%, from 87% to 95%, from 90% to 95%, from 87% to 93%, or from 90% to 93% of light over the wavelength range of 400 nm to 800 nm for a glass-ceramic article having a thickness of 0.85 mm. In embodiments, the glass-ceramic may have an average transmittance of greater than or equal to 75%, greater than or equal to 80%, greater than or equal to 85%, or greater than or equal to 90% of light over the wavelength range of 400 nm to 800 nm for a glass-ceramic article having a thickness of 0.85 mm. It should be understood that the average transmittance may be within a sub-range formed from any and all of the foregoing endpoints.

In embodiments, a glass-ceramic may have an average diffuse transmittance in a range from 25% to 50% of light over a wavelength range of 400 nm to 800 nm for a glass-ceramic article having a thickness of 0.85 mm. In embodiments, the glass-ceramic may have an average diffuse transmittance in a range from 25% to 50%, from 25% to 45%, from 25% to 40%, from 30% to 50%, from 30% to 45%, from 30% to 40%, from 35% to 50%, from 35% to 45%, from 35% to 40%, from 37% to 50%, from 37% to 45%, or from 37% to 40% over the wavelength range of 400 nm to 800 nm for a glass-ceramic article having a thickness of 0.85 mm. In embodiments, the glass-ceramic may have an average diffuse transmittance of greater than or equal to 25%, greater than or equal to 30%, or greater than or equal to 35% of light over a wavelength range of 400 nm to 800 nm for a glass-ceramic article having a thickness of 0.85 mm. It should be understood that the average diffuse transmittance may be within a sub-range formed from any and all of the foregoing endpoints.

In embodiments, the glass-ceramic may have a liquidus viscosity of greater than 1 kilopoise (kP) or greater than 10 kP. In embodiments, the glass-ceramic may have a liquidus viscosity of greater than 1 kP, greater than 2 kP, greater than 3 kP, greater than 4 kP, greater than 5 kP, greater than 6 kP, greater than 7 kP, greater than 8 kP, greater than 9 kP, greater than 10 kP, greater than 15 kP, greater than 20 kP, greater than 25 kP, or greater than 30 kP. In embodiments, the glass-ceramic may have a liquidus viscosity of from greater than or equal to 1 kP to less than or equal to 30 kP, from greater than or equal to 5 kP to less than or equal to 25 kP, from greater than or equal to 10 kP to less than or equal to 20 kP, from greater than or equal to 1 kP to less than or equal to 20 kP, from greater than or equal to 1 kP to less than or equal to 10 kP, and any and all sub-ranged formed from any of these endpoints. This range of viscosities allows the glass-ceramic to be formed into sheets by a variety of different techniques including, without limitation fusion forming, slot draw, floating, rolling, and other sheet-forming processes known to those in the art. However, it should be understood that other processes may be used for forming other articles (i.e., other than sheets).

In embodiments, the glass precursors or glass-ceramic compositions described herein are ion exchangeable to facilitate strengthening the glass-ceramic. In typical ion exchange processes, smaller metal ions in the glass-ceramic are replaced or "exchanged" with larger metal ions of the same valence within a layer that is close to the outer surface of the glass-ceramic. The replacement of smaller ions with larger ions creates a compressive stress within the layer of the glass-ceramic. In embodiments, the metal ions are monovalent metal ions (e.g., $Na^+$, $K^+$, and the like), and ion exchange is accomplished by immersing the glass-ceramic in a bath comprising at least one molten salt of the larger metal ion that is to replace the smaller metal ion in the glass-ceramic. Alternatively, other monovalent ions such as $Ag^+$, $Tl^+$, $Cu^+$, and the like may be exchanged for monovalent ions. The ion exchange process or processes that are used to strengthen the glass-ceramic may include, but are not limited to, immersion in a single bath or multiple baths of like or different compositions with washing and/or annealing steps between immersions. In embodiments, the glass-ceramics may be ion exchanged by exposure to molten $Li_2SO_4$ salt at a temperature of 500° C. In such embodiments, the $Li^+$ ions replace some portion of the Mg ions in the glass-ceramic to develop a surface compressive layer and exhibit high crack resistance. The resulting compressive stress layer may have a depth (also referred to as a "depth of compression" of "DOC") of at least 100 μm from the surface of the glass-ceramic in 2 hours. In embodiments, the bath further comprises molten $K_2SO_4$ salt. In embodiments, the glass-ceramics may be ion exchanged to achieve a depth of compression of 10 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In embodiments, the glass-ceramics may be ion exchanged to achieve a central tension of at least 10 MPa. The development of this surface compression layer is beneficial for achieving a better crack resistance and higher flexural strength compared to non-ion-exchanged materials. The surface compression layer has a higher concentration of the ions exchanged into the glass-ceramic article in comparison to the concentration of the ions exchanged into the glass-ceramic article for the body (i.e., the area not including the surface compression) of the glass-ceramic article.

In embodiments, the glass-ceramic may have a surface compressive stress after ion exchange strengthening in a range from 100 MPa to 500 MPa, from 100 MPa to 450 MPa, from 100 MPa to 400 MPa, from 100 MPa to 350 MPa, from 100 MPa to 300 MPa, from 100 MPa to 250 MPa, from 100 MPa to 200 MPa, from 100 MPa to 150 MPa, from 150 MPa to 500 MPa, from 150 MPa to 450 MPa, from 150 MPa to 400 MPa, from 150 MPa to 350 MPa, from 150 MPa to 300 MPa, from 150 MPa to 250 MPa, from 150 MPa to 200 MPa, from 200 MPa to 500 MPa, from 200 MPa to 450 MPa, from 200 MPa to 400 MPa, from 200 MPa to 350 MPa, from 200 MPa to 300 MPa, from 200 MPa to 250 MPa, from 250 MPa to 500 MPa, from 250 MPa to 450 MPa, from 250 MPa to 400 MPa, from 250 MPa to 350 MPa, from 250 MPa to 300 MPa, from 300 MPa to 500 MPa, from 300 MPa to 450 MPa, from 300 MPa to 400 MPa, from 300 MPa to 350 MPa, from 350 MPa to 500 MPa, from 350 MPa to 450 MPa, from 350 MPa to 400 MPa, from 400 MPa to 500 MPa, from 400 MPa to 450 MPa, or from 450 MPa to 500 MPa, or any and all sub-ranges formed from any of these endpoints. In embodiments, the glass-ceramic may have a surface compressive stress of 100 MPa or greater, 150 MPa or greater, 200 MPa or greater, 250 MPa or greater, 300 MPa or greater, 350 MPa or greater, 400 MPa or greater, 450 MPa or greater, or 500 MPa or greater.

In embodiments, the processes for making the glass-ceramic includes heat treating the precursor glass at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). In embodiments, the heat treatment may include (i) heating a glass-ceramic composition at a rate of 1-10° C./min to a glass pre-nucleation temperature; (ii) maintaining the glass-ceramic composition at the pre-nucleation temperature for a time in a range from 0.25 hour to 4 hours to produce pre-nucleated crystallizable glasses; (iii) heating the pre-nucleated crystallizable glasses at a rate of 1-10° C./min to a nucleation temperature (Tn); (iv) maintaining the pre-nucleated crystallizable glasses at the nucleation temperature for a time in the range from between 0.25 hour to 4 hours to produce nucleated crystallizable glasses; (v) heating the nucleated crystallizable glasses at a rate in the range from 1° C./min to 10° C./min to a crystallization temperature (Tc); (vi) maintaining the nucleated crystallizable glasses at the crystallization temperature for a time in a range from 0.25 hour to 4 hour to produce the glass-ceramic described herein; and (vii) cooling the formed glass-ceramic to room temperature.

As used herein, the term "crystallization temperature" may be used interchangeably with "ceram temperature" or "ceramming temperature." In addition, the terms "ceram" or "ceramming" in these embodiments, may be used to refer to steps (v), (vi) and optionally (vii), collectively. In embodiments, the glass pre-nucleation temperature may be in a range from 750° C. to 850° C., the nucleation temperature (Tn) may be in a range from 800° C. to 900° C., and the crystallization temperature (Tc) may be in a range from 850° C. to 1000° C. In embodiments, the pre-nucleation temperature may be 800° C., the nucleation temperature (Tn) is 850° C., and the crystallization temperature (Tc) is 900° C. In embodiments, the pre-nucleation temperature may be 800° C., the nucleation temperature (Tn) is 850° C., and the crystallization temperature (Tc) is 925° C.

In other embodiments, the heat treatment does not include maintaining the crystallizable glasses at a glass pre-nucleation temperature. Thus, the heat treatment may include (i) heating the pre-nucleated crystallizable glasses at a rate of 1-10° C./min to a nucleation temperature (Tn); (ii) maintaining the crystallizable glasses at the nucleation temperature for a time in the range from between 0.25 hour to 4 hours to produce nucleated crystallizable glasses; (iii) heating the nucleated crystallizable glasses at a rate in the range from 1° C./min to 10° C./min to a crystallization temperature (Tc); (iv) maintaining the nucleated crystallizable glasses at the crystallization temperature for a time in a range from 0.25 hour to 4 hours to produce the glass-ceramic described herein; and (v) cooling the formed glass-ceramic to room temperature. The terms "ceram" and "ceramming" in the preceding embodiments may be used to refer to steps (iii), (iv) and optionally (v), collectively. In some embodiments, the nucleation temperature may be 800° C. and the crystallization temperature may be 900° C.

Temperature-temporal profiles of heat treatment steps of heating to the crystallization temperature and maintaining the temperature at the crystallization temperature in addition to precursor glass compositions are judiciously prescribed so as to produce one or more of the following desired attributes: crystalline phase(s) of the glass-ceramic, proportions of one or more major crystalline phases and/or one or more minor crystalline phases and glass, crystal phase assemblages of one or more predominate crystalline phases and/or one or more minor crystalline phases and glass, and grain sizes or grain size distribution among one or more major crystalline phases and/or one or more minor crystalline phases, which in turn may influence the final integrity, quality, color, and/or opacity of the resultant glass-ceramic.

In embodiments, the processes for making the glass-ceramic further includes developing microcracks in the glass. "Microcracks" refers to cracks that form in the glass-ceramic located between the grains of crystallized material and along grain boundaries. Microcracks may develop by producing quartz crystal grains so large that, upon cooling, stress is generated along the grain boundaries due to the difference in the coefficient of thermal expansion between grains oriented parallel to the c-axis and grains oriented parallel to the a-axis. That is, the quartz crystal grains have an anisotropic coefficient of thermal expansion such that the coefficient of thermal expansion along the c-axis of the crystalline structure is different than the coefficient of thermal expansion along the a-axis of the crystalline structure. Thus, when adjacent grains are arranged such that the c-axis of one grain is non-parallel with the c-axis of the second grain, the differential in the coefficients of thermal expansion along the a- and c-axes results in microcracking along the grain boundaries and between the grains. In general, this microcracking occurs when the grain size of the individual grains is greater than or equal to about 50 μm. In embodiments, the length of a microcrack may extend along a grain boundary and branch to extend along other grain boundaries. In embodiments, the width of a microcrack may be less than or equal to 1 μm or less than or equal to 0.5 Microcracks in the glass-ceramic are intentionally developed, at least in part, by controlling the crystallization temperature (Tc) and time. The microcracks may form when the glass-ceramic is cooled from a high temperature (e.g., from 925° C. to 1000° C.) due to differences in thermal expansion along axes.

It was unexpectedly found that a glass-ceramic article comprising microcracks in the glass portion of the glass ceramic (including along grain boundaries) remains strong and the fracture toughness actually increases as compared to a glass-ceramic article without microcracks. In embodiments, the microcracked glass-ceramics may exhibit a fracture toughness of greater than or equal to 1.8 MPa·m$^{1/2}$, greater than or equal to 1.9 MPa·m$^{1/2}$, greater than or equal to 2.0 MPa·m$^{1/2}$, greater than or equal to 2.1 MPa·m$^{1/2}$, greater than or equal to 2.2 MPa·m$^{1/2}$, greater than or equal to 2.3 MPa·m$^{1/2}$, greater than or equal to 2.4 MPa·m$^{1/2}$, greater than or equal to 2.5 MPa·m$^{1/2}$, greater than or equal to 2.6 MPa·m$^{1/2}$, greater than or equal to 2.7 MPa·m$^{1/2}$, or greater than or equal to 2.8 MPa·m$^{1/2}$. In embodiments, the glass-ceramics may exhibit a fracture toughness in the range of from 1.8 to 2.8 MPa·m$^{1/2}$, from 1.8 to 2.5 MPa·m$^{1/2}$, from 2.0 to 2.8 MPa·m$^{1/2}$, or from 2.0 to 2.5 MPa·m$^{1/2}$.

In embodiments, the processes for making the glass-ceramic may further include disposing a polymer filler in the microcracks. Microcracking may cause the glass-ceramic to opacify. Specifically, light traveling through the microcracked glass-ceramic is reflected by the crack faces of the microcracks thereby reducing the transmittance of the microcracked glass-ceramic and causing the microcracked glass-ceramic to appear opaque. However, the transmittance of the microcracked glass-ceramic may be improved or even restored by filling the microcracks with the polymer filler. The polymer filler is selected such that the refractive index of the polymer filler is similar to that of the glass-ceramic. Filling the microcracks with the polymer filler may increase or restore the transmittance of the glass-ceramic. In embodiments, the polymer filler comprises an index of refraction greater than or equal to 1.51 and less than or equal to 1.58. In embodiments, the polymer filler comprises an index of refraction of 1.55. In embodiments, the polymer filler may include acrylate monomers, methacrylate monomers, urethane acrylate oligomers, epoxy acrylate oligomers, polyester acrylate oligomers, or a combination thereof.

Moreover, a glass-ceramic article comprising microcracks filled with a polymer filler may also exhibit further improvement in the fracture toughness of the glass-ceramic. In embodiments, the polymer filled glass-ceramics may exhibit a fracture toughness of greater than or equal to 2.0 MPa·m$^{1/2}$, greater than or equal to 2.1 MPa·m$^{1/2}$, greater than or equal to 2.2 MPa·m$^{1/2}$, greater than or equal to 2.3 MPa·m$^{1/2}$, greater than or equal to 2.4 MPa·m$^{1/2}$, greater than or equal to 2.5 MPa·m$^{1/2}$, greater than or equal to 2.6 MPa·m$^{1/2}$, greater than or equal to 2.7 MPa·m$^{1/2}$, greater than or equal to 2.8 MPa·m$^{1/2}$, greater than or equal to 2.9 MPa·m$^{1/2}$, or greater than or equal to 3.0 MPa·m$^{1/2}$. In embodiments, the glass-ceramics may exhibit a fracture toughness in the range of from 2 to 3 MPa·m$^{1/2}$, from 2 to 2.7 MPa·m$^{1/2}$, or from 2 to 2.5 MPa·m$^{1/2}$.

The resultant glass-ceramic may be provided as a sheet, which may then be reformed by pressing, blowing, bending, sagging, vacuum forming, or other means into curved or bend pieces of uniform thickness. Reforming may be done before thermally treating or the forming step may also serve as a thermal treatment step in which both forming and thermal treating are performed substantially simultaneously.

Figure 1:
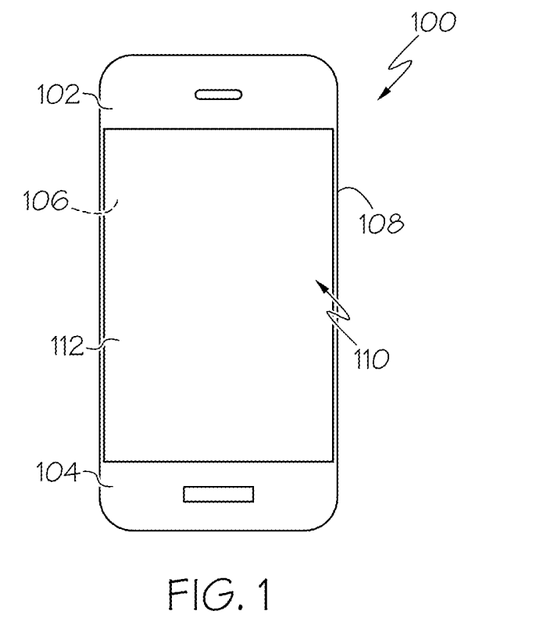
FIG. 1 is a plan view of an exemplary electronic device incorporating any of the glass-ceramic articles disclosed herein.
Figure 2:
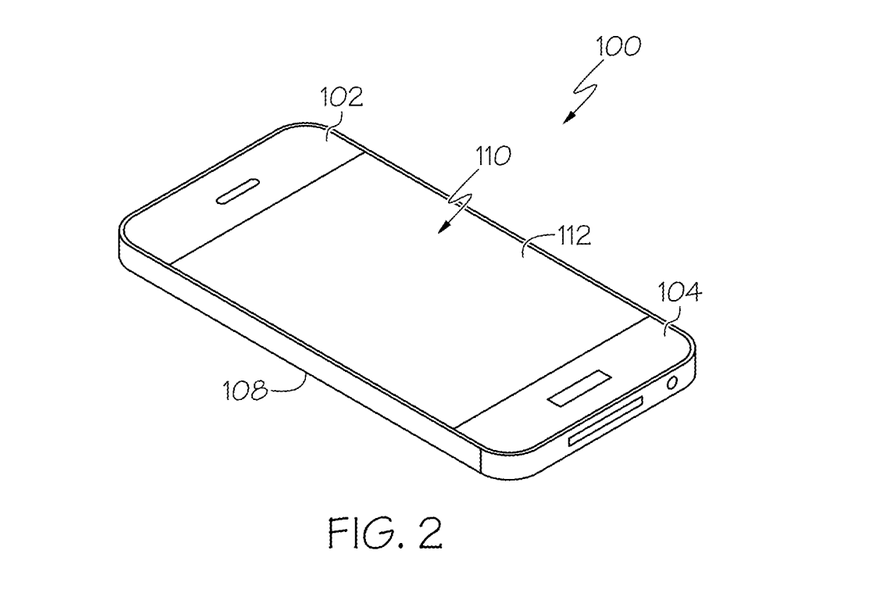
FIG. 2 is a perspective view of the exemplary electronic device of FIG. 1.

The glass-ceramics and glass-ceramic articles described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein. An exemplary article incorporating any of the glass-ceramic articles disclosed herein is shown in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least one of the cover substrate 112 or a portion of housing 102 may include any of the glass-ceramic articles disclosed herein.

EXAMPLES

In order that various embodiments be more readily understood, reference is made to the following examples, which are intended to illustrate various embodiments of the glass-ceramics described herein.

Example 1

Table 1 shows example glass precursors and glass-ceramic compositions (in terms of mol %), the ceram schedule for achieving glass-ceramic articles, and the respective properties of the glass precursors and glass-ceramic compositions. Precursor glasses were formed having the compositions 1-8 listed in Table 1. The term "coarse-grained" refers to glass-ceramics having grains with grain sizes of 10-75 μm crystals. The term "fine-grained" refers to glass-ceramics having grains with grain sizes of <10 μm. The term "medium-grained" refers to glass-ceramics having grains with grain sizes of 5-15 μm crystals, falling between and overlapping the ranges for "fine-grained" and "coarse-grained."

TABLE 1

|  | 1 | 2 | 3 | 4 |
|---|---|---|---|---|
| SiO$_2$ (mol %) | 57.6 | 57.8 | 58.1 | 74.3 |
| Al$_2$O$_3$ (mol %) | 19.2 | 20.3 | 20.3 | 12.0 |
| MgO (mol %) | 14.4 | 14.6 | 14.7 | 7.6 |
| Li$_2$O (mol %) | 4.8 | 4.9 | 4.9 | 4.1 |
| ZnO (mol %) | 0.0 | 0.0 | 0.0 | 0.0 |
| ZrO$_2$ (mol %) | 4.0 | 2.5 | 2.0 | 2.0 |
| Glass homogenation hold | 800° C. for 2 hrs. | 800° C. for 2 hrs. | 800° C. for 4 hrs. | 800° C. for 2 hrs. |
| Nucleation hold | — | — | 850° C. for 4 hrs. | — |
| Crystallization hold | 950° C. for 4 hrs. | 900° C. for 4 hrs. | 900° C. for 4 hrs. | 900° C. for 4 hrs. |
| Appearance | Transparent; fine-grained | Transparent; medium grained | Transparent; coarse grained | Transparent; coarse grained |
| Crystalline phase | stuffed β-quartz and tetragonal zirconia | stuffed β-quartz and tetragonal zirconia | stuffed β-quartz and tetragonal zirconia | stuffed β-quartz and tetragonal zirconia |
| [MgO + Li$_2$O + ZnO]:Al$_2$O$_3$:SiO$_2$ of stuffed β-quartz | 1:1:3 | 1:1:2.9 | 1:1:2.9 | 1:1:6.2 |
| Estimated grain size | 1-2 μm | 5-15 μm | ~30 μm | >15 μm |
| Fracture toughness (MPa · m$^{1/2}$) | >1 | 1.0-1.1 | 1.67 ± 0.10 | — |
| Microcracked fracture toughness (MPa · m$^{1/2}$) | — | — | 2.11 | — |
| Polymer filled fracture toughness (MPa · m$^{1/2}$) | — | — | 2.48 ± 0.10 | — |

|  | 5 | 6 | 7 | 8 |
|---|---|---|---|---|
| SiO$_2$ (mol %) | 62.6 | 66.2 | 53.4 | 57.6 |
| Al$_2$O$_3$ (mol %) | 17.7 | 16 | 21.4 | 20.1 |
| MgO (mol %) | 13.3 | 12 | 21.4 | 9.0 |
| Li$_2$O (mol %) | 4.4 | 3.9 | 0.0 | 4.8 |
| ZnO (mol %) | 0.0 | 0.0 | 0.0 | 6.2 |
| ZrO$_2$ (mol %) | 2.0 | 1.9 | 3.8 | 2.3 |

TABLE 1-continued

| | | | | |
|---|---|---|---|---|
| Glass homogenation hold | 800° C. for 4 hrs. | 825° C. for 4 hrs. | 800° C. for 2 hrs. | 800° C. for 2 hrs. |
| Nucleation hold | 850° C. for 4 hrs. | 875° C. for 4 hrs. | — | — |
| Crystallization hold | 900° C. for 4 hrs. | 925° C. for 4 hrs. | 925° C. for 4 hrs. | 850° C. for 4 hrs. |
| Appearance | Transparent; coarse grained | Transparent; coarse grained | Translucent; coarse grained | Translucent; coarse grained |
| Crystalline phase | stuffed β-quartz and tetragonal zirconia | stuffed β-quartz and tetragonal zirconia | stuffed β-quartz and tetragonal zirconia | stuffed β-quartz and tetragonal zirconia |
| $[MgO + Li_2O + ZnO]:Al_2O_3:SiO_2$ of stuffed β-quartz | 1:1:3.6 | 1:1:4.1 | 1:1:2.5 | 1:1:2.9 |
| Estimated grain size | ~30 μm | 20-40 μm | 15-30 μm | 15-40 μm |
| Fracture toughness $(MPa \cdot m^{1/2})$ | 1.47 ± 0.09 | — | — | — |
| Microcracked fracture toughness $(MPa \cdot m^{1/2})$ | — | — | — | — |
| Polymer filled fracture toughness $(MPa \cdot m^{1/2})$ | — | — | — | — |

As shown in Table 1, the glass-ceramic compositions disclosed herein having a relatively low amount of nucleating agent result in transparent glass-ceramics having relatively larger grain sizes, which leads to relatively higher values of fracture toughness.

Figure 3:
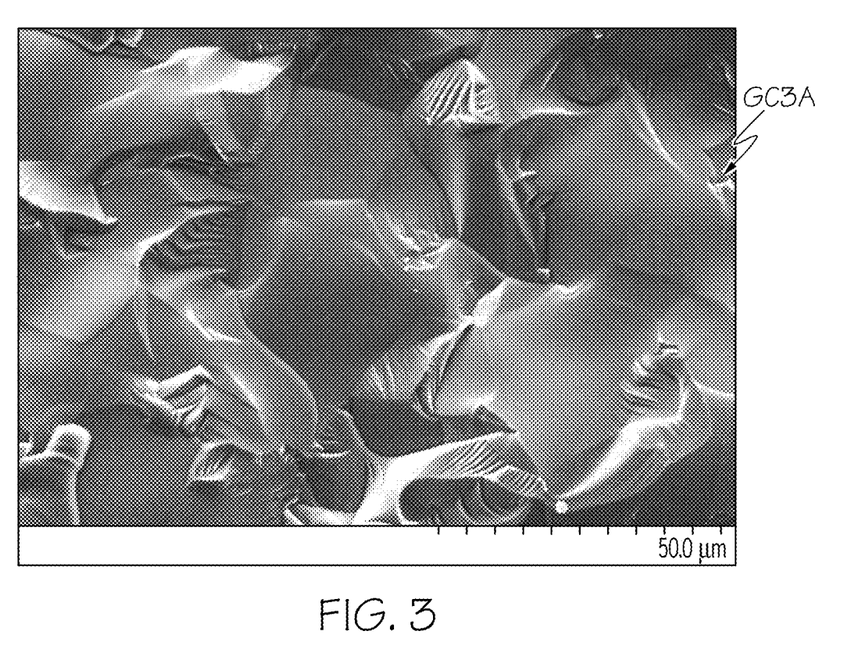
FIG. 3 is a fractured-surface scanning electron microscope image of an example glass-ceramic according to one or more embodiments described herein.
Figure 4:
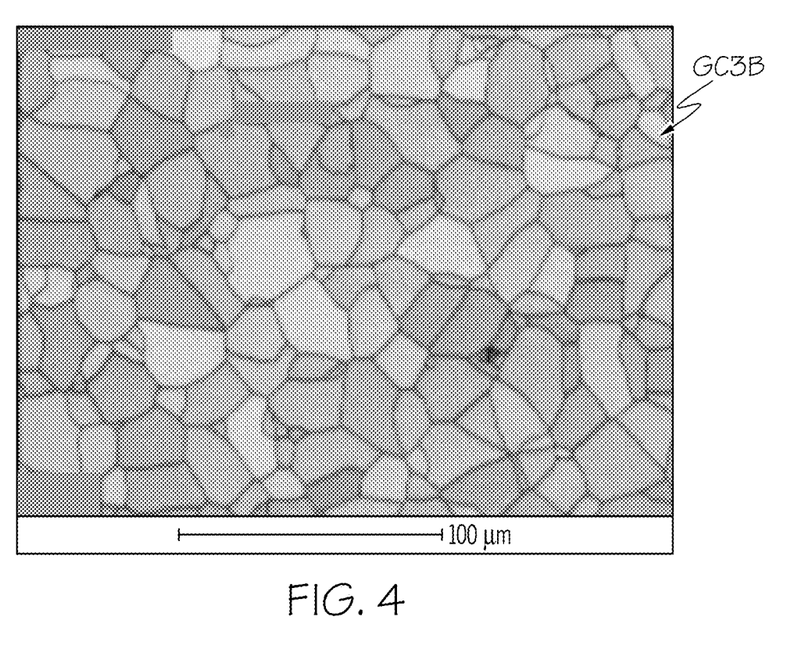
FIG. 4 is a polished-surface scanning electron microscope image of the example glass-ceramic of FIG. 3.

A fractured-surface scanning electron image and a polished-surface scanning electron microscope image were taken of the glass-ceramic made from glass-ceramic composition 3. As shown in FIG. 3, the resulting glass-ceramic GC3A has a rough peak-and-valley structure from large (30 μm) pullout. As indicated by FIG. 4, the resulting glass-ceramic GC3B is highly crystalline (approximately greater than 95% crystalline) and coarse-grained. In particular, the polished-surface scanning electron microscope image of the resulting glass-ceramic GC3B in FIG. 4 shows stuffed β-quartz crystals with grain boundaries that contain only small crystals of $ZrO_2$.

Figure 5:
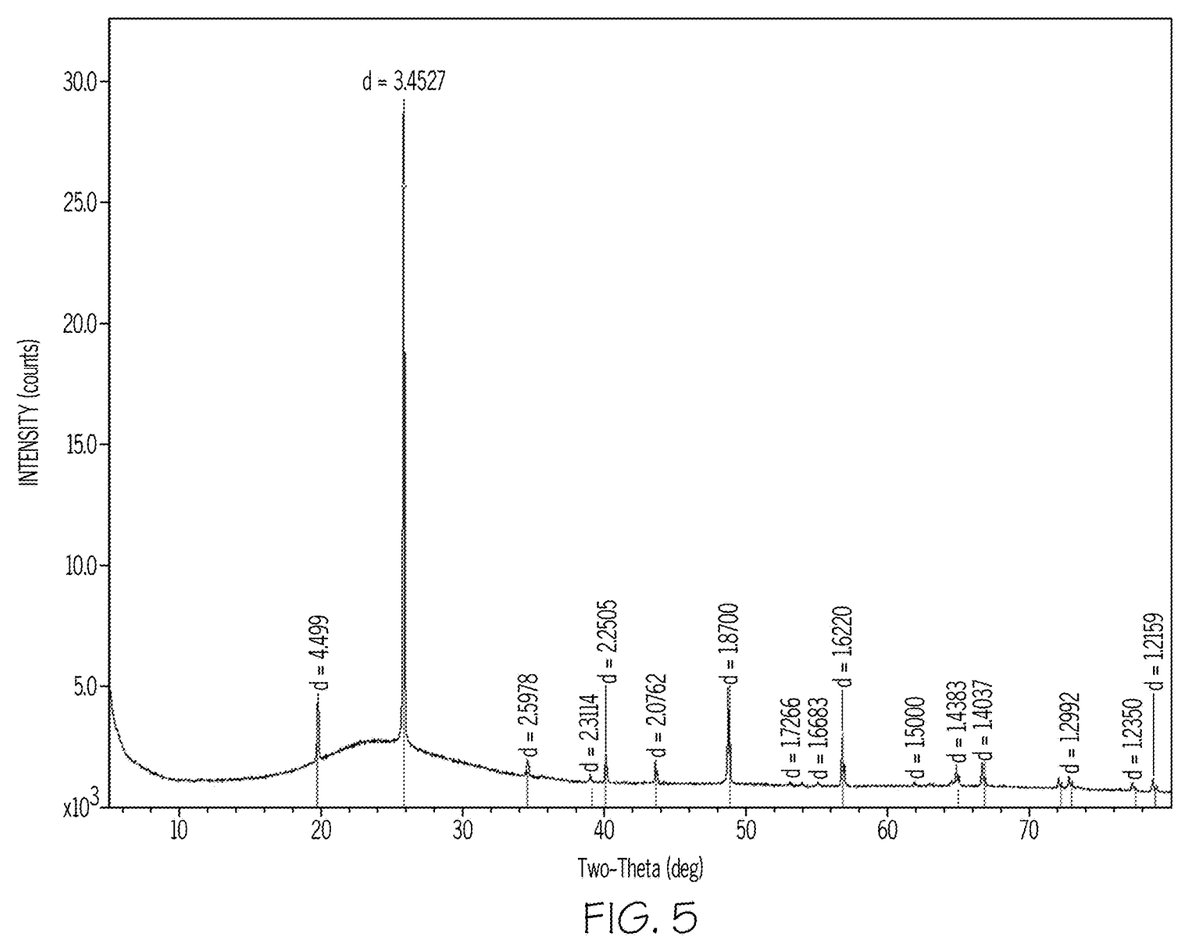
FIG. 5 is an X-ray diffraction (XRD) spectrum of a glass-ceramic according to one or more embodiments described herein.

Referring now to FIG. 5, the XRD spectrum of the glass-ceramic made from glass-ceramic composition 5 includes peaks that evidence the presence of stuffed β-quartz and glass. As shown in Table 1, the glass-ceramics made from glass-ceramic compositions 1-8 include stuffed β-quartz.

Figure 6:
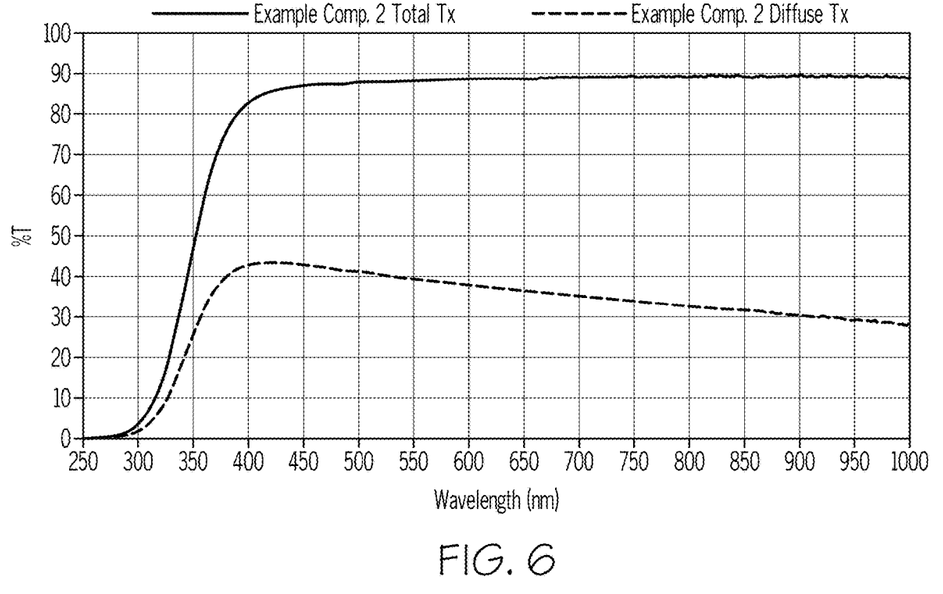
FIG. 6 is a plot of the transmittance of an example glass-ceramic as a function of wavelength for a sample thickness of 0.81 mm according to one or more embodiments described herein.
Figure 7:
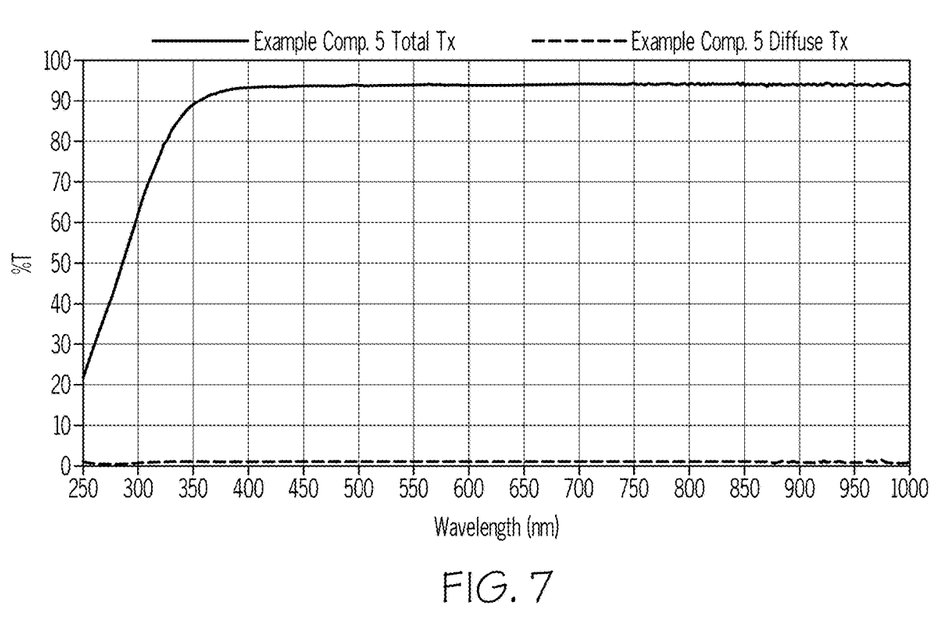
FIG. 7 is a plot of the transmittance of an example glass-ceramic as a function of wavelength for a sample thickness of 0.9 mm according to one or more embodiments described herein.
Figure 8:
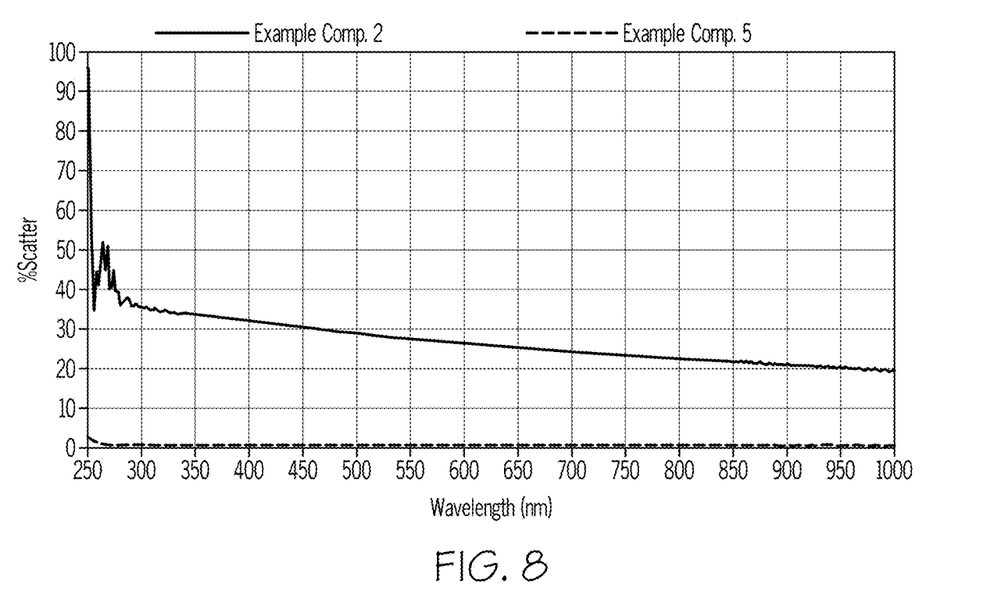
FIG. 8 is a plot of the scatter of example glass-ceramics as a function of wavelength according to one or more embodiments described herein.

The transmittance and scatter of glass-ceramics made from example glass-ceramic composition 2 having a 0.81 mm thickness and example glass-ceramic composition 5 having a 0.9 mm thickness were measured for light having a wavelength from 250 nm to 1000 nm. As shown in FIGS. 6 and 7, the two different compositions had a similar total transmittance, particularly over the wavelength range of 400 nm to 800 nm. The glass-ceramic made from example glass-ceramic composition 2 having a 0.81 mm thickness had an average total transmittance of 90.19% over the wavelength range of 400 nm to 800 nm. The glass-ceramic made from example glass-ceramic composition 5 having a 0.9 mm thickness had an average total transmittance of 88.07% over the wavelength range of 400 nm to 800 nm. However, as shown in FIG. 8, the percentage of scatter in the fine-grained glass-ceramic made from example glass-ceramic composition 2 ranges from about 30% at 1000 nm to over 40% at 450 nm, while there is 0% scatter in the coarse-grained glass-ceramic made from example glass-ceramic composition glass 5.

As mentioned hereinabove, the transmission measurements of the glass-ceramics made from example glass-ceramic composition 2 and example glass-ceramic composition 5 as shown in FIGS. 6 and 7 were conducted on articles having a 0.81 thickness and a 0.9 thickness, respectively. Transmission varies with articles having the same composition but different thicknesses. It should be expected that a glass-ceramic made from example glass-ceramic composition 2 and a glass-ceramic made from example glass-ceramic composition 5 would have an average transmittance in a range from 75% to 95% of light over the wavelength range of 400 nm to 800 nm as measured at an article thickness of 0.85 mm Referring back to FIG. 6, the glass-ceramic made from example glass-ceramic composition 2 having a 0.81 mm thickness had an average diffuse transmittance of 38.8% over the wavelength range of 400 nm to 800 nm and 37.17% over the wavelength range of 600 nm to 700 nm.

Figure 9:
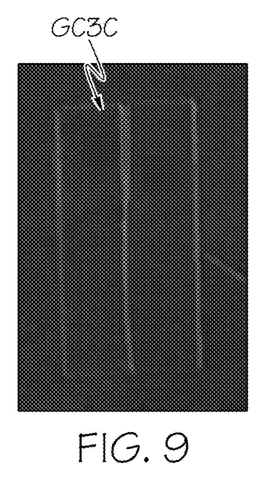
FIG. 9 is a photograph of an example glass-ceramic according to one or more embodiments described herein.
Figure 10:
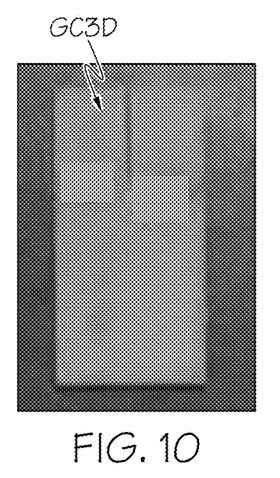
FIG. 10 is a photograph of an example glass-ceramic after microcracking according to one or more embodiments described herein.
Figure 11:
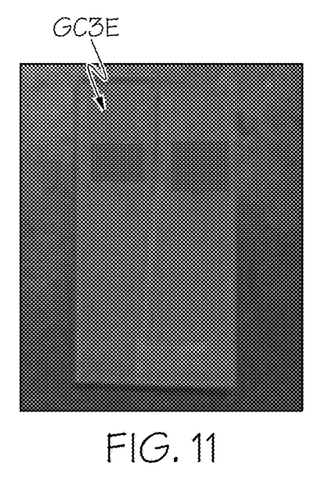
FIG. 11 is a photograph of an example glass-ceramic with polymer filler according to one or more embodiments described herein.

Photographs were taken of the glass-ceramic made from example glass-ceramic composition 3, example glass-ceramic composition 3 after microcracking, and example glass-ceramic composition 3 with the polymer filler Ultra Bond® 20, a commercially available polyurethane acrylate oligomer mixture refractive index matched to soda lime glass and, therefore, has an index of refraction of approximately 1.51. As shown in FIG. 9, the glass-ceramic GC3C made from example glass-ceramic composition 3 is transparent. As shown in FIG. 10, the glass-ceramic GC3D made from example glass-ceramic composition 3 after microcracking is opaque. As shown in FIG. 11, the glass-ceramic GC3E made from example glass-ceramic composition 3 with polymer filler is translucent. With polymer impregnation, translucency of the glass-ceramic was regained. While not wishing to be bound by theory, it is believed that with better index matching between the polymer and crystal, the material will regain transparency.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-ceramic article comprising:
50 mol % to 80 mol % $SiO_2$;
10 mol % to 25 mol % $Al_2O_3$;
5 mol % to 20 mol % MgO;

0 mol % to 10 mol % $Li_2O$; and 1 mol % to 3 mol % of a nucleating agent, the nucleating agent selected from the group consisting of $ZrO_2$, $TiO_2$, $SnO_2$, $HfO_2$, $Ta_2O_5$, $Nb_2O_5$, $Y_2O_3$, and combinations thereof, wherein:

the nucleating agent comprises greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof;

a molar ratio of MgO to $Li_2O$ is greater than or equal to 1:1;

$0.85 \leq (MgO\ (mol\ \%)+Li_2O\ (mol\ \%))/Al_2O_3(mol\ \%) \leq 1.2$;

the glass-ceramic article comprises a crystalline phase comprising hexagonal stuffed β-quartz and glass; and grains of the crystalline phase comprise a grain size in a range from greater than or equal to 20 μm to less than or equal to 75 μm.

2. The glass-ceramic article of claim 1, wherein the glass-ceramic article comprises:

55 mol % to 65 mol % $SiO_2$;
18 mol % to 22 mol % $Al_2O_3$;
13 mol % to 16 mol % MgO;
2 mol % to 8 mol % $Li_2O$; and
1.5 mol % to 2.7 mol % of the nucleating agent.

3. The glass-ceramic article of claim 1, wherein the crystalline phase comprises a stoichiometry of [MgO+$Li_2O$+ZnO]:0.8-1.25 $Al_2O_3$:2.0-8.0 $SiO_2$.

4. The glass-ceramic article of claim 1, wherein the crystalline phase further comprises tetragonal zirconia.

5. The glass-ceramic article of claim 1, further comprising ZnO.

6. The glass-ceramic article of claim 5, wherein MgO (mol %)+$Li_2O$ (mol %)+ZnO (mol %) is from 10 mol % to 28 mol %.

7. The glass-ceramic article of claim 5, wherein ZnO (mol %)/(MgO (mol %)+$Li_2O$ (mol %)+ZnO (mol %)) is less than or equal to 0.5.

8. The glass-ceramic article of claim 1, wherein the glass-ceramic article has a fracture toughness greater than or equal to 1.0 $MPa \cdot m^{1/2}$.

9. The glass-ceramic article of claim 1, wherein the glass-ceramic article has an average transmittance in a range from 75% to 95% of light over the wavelength range of 400 nm to 800 nm as measured at an article thickness of 0.85 mm.

10. The glass-ceramic article of claim 1, wherein the glass-ceramic article comprises greater than or equal to 50 wt % of the crystalline phase and less than or equal to 50 wt % glass.

11. The glass-ceramic article of claim 1, wherein the glass-ceramic article comprises microcracks in the glass.

12. The glass-ceramic article of claim 11, wherein the glass-ceramic article has a fracture toughness greater than or equal to 1.8 $MPa \cdot m^{1/2}$.

13. The glass-ceramic article of claim 11, further comprising a polymer filler disposed in the microcracks.

14. The glass-ceramic article of claim 13, wherein the polymer filler comprises an index of refraction greater than or equal to 1.51 and less than or equal to 1.58.

15. The glass-ceramic article of claim 13, wherein the glass-ceramic article comprising the microcracks filled with the polymer filler has a fracture toughness of greater than or equal to 2.0 $MPa \cdot m^{1/2}$.

16. A consumer electronic device, comprising:

a housing having a front surface, a back surface, and side surfaces;

electrical components at least partially within the housing, the electrical components comprising at least a controller, a memory, and a display, the display at or adjacent the front surface of the housing; and the glass-ceramic article of claim 1 disposed over the display.

17. A glass-ceramic article comprising:

50 mol % to 80 mol % $SiO_2$;
10 mol % to 25 mol % $Al_2O_3$;
5 mol % to 20 mol % MgO;
0 mol % to 10 mol % $Li_2O$; and
1 mol % to 3 mol % of a nucleating agent, the nucleating agent selected from the group consisting of $ZrO_2$, $TiO_2$, $SnO_2$, $HfO_2$, $Ta_2O_5$, $Nb_2O_5$, $Y_2O_3$, and combinations thereof, wherein:

the nucleating agent comprises greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof;

a molar ratio of MgO to $Li_2O$ is greater than or equal to 1:1;

$0.85 \leq (MgO\ (mol\ \%)+Li_2O\ (mol\ \%))/Al_2O_3(mol\ \%) \leq 1.2$;

the glass-ceramic article comprises a crystalline phase comprising hexagonal stuffed β-quartz and tetragonal zirconia and glass; and grains of the crystalline phase comprise a grain size in a range from greater than 10 μm to less than or equal to 75 μm.

18. A glass-ceramic article comprising:

50 mol % to 80 mol % $SiO_2$;
10 mol % to 25 mol % $Al_2O_3$;
5 mol % to 20 mol % MgO;
0 mol % to 10 mol % $Li_2O$; and
1 mol % to 3 mol % of a nucleating agent, the nucleating agent selected from the group consisting of $ZrO_2$, $TiO_2$, $SnO_2$, $HfO_2$, $Ta_2O_5$, $Nb_2O_5$, $Y_2O_3$, and combinations thereof, wherein:

the nucleating agent comprises greater than or equal to 50% $ZrO_2$ and less than 50% of at least one compound selected from the group consisting of $TiO_2$, $SnO_2$, $HfO_2$, $Ta_2O_5$, $Nb_2O_5$, $Y_2O_3$, and combinations thereof;

a molar ratio of MgO to $Li_2O$ is greater than or equal to 1:1;

$0.85 \leq (MgO\ (mol\ \%)+Li_2O\ (mol\ \%))/Al_2O_3(mol\ \%) \leq 1.2$;

the glass-ceramic article comprises a crystalline phase comprising hexagonal stuffed β-quartz and glass;

grains of the crystalline phase comprise a grain size in a range from greater than 10 μm to less than or equal to 75 μm; and the glass-ceramic article comprises microcracks in the glass.

* * * * *